United States Patent
Klein et al.

(10) Patent No.: US 9,632,518 B2
(45) Date of Patent: Apr. 25, 2017

(54) THERMOSTAT

(71) Applicant: MAHLE International GmbH, Stuttgart (DE)

(72) Inventors: Hans-Peter Klein, Leutenbach (DE); Eike Willers, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 391 days.

(21) Appl. No.: 14/271,914

(22) Filed: May 7, 2014

(65) Prior Publication Data

US 2014/0332599 A1 Nov. 13, 2014

(30) Foreign Application Priority Data

May 7, 2013 (DE) .................. 10 2013 208 412

(51) Int. Cl.
G05D 23/02 (2006.01)
G05D 23/19 (2006.01)

(52) U.S. Cl.
CPC ......... G05D 23/1925 (2013.01); G05D 23/02 (2013.01)

(58) Field of Classification Search
CPC ....... G05D 23/02; G05D 23/1925; F01P 7/00; F01P 7/16; F01P 2007/168
USPC ...................................................... 236/34.5
See application file for complete search history.

(56) References Cited

U.S. PATENT DOCUMENTS

| | | | |
|---|---|---|---|
| 2,974,869 A | 3/1961 | Hajny | |
| 3,686,857 A * | 8/1972 | Berg | F03G 7/06 236/68 R |
| 4,239,153 A * | 12/1980 | Monigold | F16K 17/38 236/35.3 |
| 4,507,921 A | 4/1985 | Hammarstedt | |
| 4,541,735 A * | 9/1985 | Abu-Isa | G01K 5/52 236/101 R |
| 4,666,081 A * | 5/1987 | Cook | F01P 7/167 236/34.5 |
| 4,685,651 A | 8/1987 | Nouvelle et al. | |
| 7,172,133 B2 | 2/2007 | Starck et al. | |
| 2002/0070367 A1* | 6/2002 | Friesenhahn | F01P 7/167 251/11 |
| 2006/0057460 A1 | 3/2006 | Matthias et al. | |

FOREIGN PATENT DOCUMENTS

| | | |
|---|---|---|
| DE | 30 33 843 C2 | 4/1981 |
| DE | 40 30 383 A1 | 4/1992 |
| DE | 101 10 185 A1 | 9/2002 |
| DE | 10 2004 043 828 A1 | 3/2006 |
| DE | 203 21 257 U1 | 7/2006 |
| DE | 10 2009 024 263 A1 | 12/2010 |
| GB | 2114292 A | 8/1983 |
| WO | WO 2011/158235 A1 | 12/2011 |

* cited by examiner

*Primary Examiner* — Marc Norman
(74) *Attorney, Agent, or Firm* — Muncy, Geissler, Olds & Lowe, P.C.

(57) ABSTRACT

A thermostat having a hollow body, wherein the hollow body is at least partly filled with a thermosensitive medium. A heating element is provided for heating the thermosensitive medium. The heating element is located outside of the hollow body and is at least partially insulated electrically from the hollow body. The element is connected to the hollow body in a thermally conductive manner.

13 Claims, 2 Drawing Sheets

THERMOSTAT

This nonprovisional application claims priority under 35 U.S.C. §119(a) to German Patent Application No. DE 10 2013 208 412.9, which was filed in Germany on May 7, 2013, and which is herein incorporated by reference.

BACKGROUND OF THE INVENTION

Field of the Invention

The present invention relates to a thermostat having a hollow body, wherein the hollow body is at least partly filled with a thermosensitive medium, wherein a heating element is provided for heating the thermosensitive medium.

Description of the Background Art

Cooling systems in motor vehicles can include an internal combustion engine, a heat exchanger, a circulating pump, and a control element, among other items. The control element in these systems can influence the flow of a coolant through the components as a function of the temperature of the coolant. In this context, flow through the heat exchanger in particular, which is often designed as a radiator, is influenced by the control element. The control element can be composed of a thermostat valve in this context.

A thermostat valve in these systems can have an expansion element that causes a displacement of an actuator as a result of a temperature-dependent volume expansion of a temperature-sensitive medium. The position of the actuator influences the flow path of the coolant within the cooling system.

Customarily, the thermosensitive media for a thermostat are designed on the basis of the operating conditions and the associated heat generation of the internal combustion engine.

Especially in operating states of the internal combustion engine in which only a partial load is required from the internal combustion engine, excessive cooling of the internal combustion engine can occur, resulting in a non-optimal operating temperature of the internal combustion engine.

Electrically heatable thermostat valves were developed in order to deal with this problem. Such thermostat valves are also referred to as map-controlled thermostat valves. So-called PTC elements (positive temperature coefficient elements) can be used for heating, for example. As a result of the electrical heating, the phase transition of the thermosensitive material can take place independently of the temperature of the coolant within certain limits, especially in operation at full load.

The document DE 101 10 185 A1, which corresponds to U.S. Pat. No. 7,172,133 (B2), and which discloses an electrically heatable thermostat valve, for example. In this design, a heating element is mounted on a plastic base. The electrical contacts here are passed through the base. The base itself is inserted into the container that holds the thermosensitive medium.

It is a particular disadvantage of the prior art solutions that sealing the container that holds the thermosensitive medium is difficult. This is true for both the interface between the container and the base and for the feed-throughs for the electrical contacts in the base or in the container.

SUMMARY OF THE INVENTION

It is therefore an object of the present invention to provide a thermostat that has an improved connection of a heating element in comparison to the prior art solutions.

An exemplary embodiment of the invention provides a thermostat having a hollow body, wherein the hollow body is at least partly filled with a thermosensitive medium, wherein a heating element is provided for heating the thermosensitive medium, wherein the heating element is located outside of the hollow body and is at least partially insulated electrically from the hollow body, wherein it is connected to the hollow body in a thermally conductive manner.

The thermostat here can be, for example, a thermostat for controlling the coolant flow in a coolant circuit of a motor vehicle with an internal combustion engine. Alternatively, applications in other fluid circuits are also possible, however.

The hollow body described contains a thermosensitive medium, and frequently is referred to in the literature as an expansion element. The hollow body constitutes the spatial boundary for the expansion material in this design. The expansion material is composed of a thermosensitive medium. A piston element can be displaced through an expansion of the thermosensitive medium. The hollow body can advantageously have a cylindrical shape here.

The thermosensitive medium can be, for example, a medium that expands or contracts as a result of temperature changes. For example, this can be a wax that experiences an especially large volume change at a phase transition from a solid phase to a liquid phase. Other media that experience sufficiently large volume changes under corresponding temperature influences may also be provided as an alternative. Advantageously, the volume change is reversible so that the original state can also be reached again with a suitable change in temperature. To this end, an actuator, such as a spring for example, can additionally be provided that acts on, e.g., the piston element and assists a return to the original state, for example.

A heating element is advantageously arranged outside the hollow body, since in contrast to an arrangement of the heating element inside the hollow body no openings permitting electrical contact to the heating element need to be provided in the hollow body.

In an alternative embodiment of the invention, provision can be made for the hollow body to be implemented as multiple parts, wherein a first housing part of the hollow body is designed as a cup-shaped shell that projects into a hollow space of the hollow body.

By means of such a design of a housing part of the hollow body, it is possible to achieve the result that the cup-shaped shell projects into the hollow space of the hollow body such that the cup-shaped shell is partially surrounded by the thermosensitive medium located in the hollow space of the hollow body. In this way improved heat transmission can be achieved from a heating element located within the cup-shaped shell to the thermosensitive medium, since the heat transmission area is increased.

Moreover, it can be especially advantageous for a second housing part to be designed as a cup-shaped housing part, wherein the cup-shaped shell and/or the cup-shaped housing part has a radially surrounding flange at an open end region, and the cup-shaped shell can be inserted into the open end region of the cup-shaped housing part and can be connected to the cup-shaped housing part at the end regions.

By means of the above-described design and positioning, the shell and the housing part can be arranged relative to one another such that a cavity is formed between the shell and housing part that is completely or partially filled by a thermosensitive medium. The construction of the hollow body is especially simple, and the parts used can be manufactured in a simple way.

The term open end region can be illustrated as for both the cup-shaped shell and the cup-shaped housing part as an end region that is open to the outside. Usually a cup-shaped body is closed on five sides and open on one side, producing the cup-shaped form. Both the shell and the housing part can be cylindrical in a preferred embodiment of this design. In this case, the open end region preferably is located at one axial end of the shell or housing part.

It can also be useful for the ratio between the inside diameter of the cup-shaped housing part and the outside diameter of the cup-shaped shell to lie in a range from greater than 1 to less than 2.5.

A ratio of the diameters as described above ensures that the thermosensitive medium can also flow into the gap in the interior of the cavity that is produced between the shell and the housing part. This improves the heat transmission from the heating element to the thermosensitive medium.

In an alternative embodiment of the invention, provision can be made for the cup-shaped shell to be connected to the cup-shaped housing part in a liquid-tight manner, wherein electrical insulation is arranged between the cup-shaped shell and the cup-shaped housing part.

A liquid-tight connection is especially advantageous since unwanted escape of the thermosensitive medium from the cavity formed by the shell and the housing part is avoided in this way. A connection between the shell and the housing part can be achieved by gluing, screwing, flanging, or welding, for example.

As a result of the arrangement of electrical insulation between the shell and the housing part, the occurrence of a short circuit can be prevented. This is especially important when the shell or the housing part is connected to an electric circuit. This can take place as a result of connection of a heating element to which a voltage is applied, for example.

In addition, it is advantageous for the heating element to be arranged in a region of the cup-shaped shell that projects into the cavity, wherein an electrically insulating layer and/or a thermally conductive layer is arranged between the heating element and the cup-shaped shell.

An arrangement of the heating element inside the region of the shell that projects into the cavity is especially advantageous because especially good heat transmission to the thermosensitive medium can be achieved in this way. In normal operation, it can occur that coolant flows around the hollow body. In order to avoid an unwanted transmission of heat from the heating element directly to the coolant, the arrangement of the heating element in the region of the shell that projects into the cavity is especially advantageous, since the heating element is maximally separated from the coolant in this way.

It is advantageous to provide electrical insulation between the heating element and the shell to avoid the occurrence of short circuits. A thermally conductive layer is especially advantageous in order to more advantageously transmit the heat generated by the heating element to the shell and to the thermosensitive medium.

Electrical insulation can advantageously be achieved with a metal oxide ceramic, for example aluminum oxide. It is especially advantageous in this implementation for the electrical insulation to nevertheless have the best possible thermal conductivity. The thermal conductivity should advantageously be greater than 2 W/mK.

The metal oxide powder used for insulation can advantageously be compressed in order to achieve optimal thermal conductivity. In this implementation, the compression can either take place by means of external action or can be produced by the process of installing the cup-shaped shell in the cup-shaped housing part, for example. In particular, this can be achieved through the provision of press fits. Alternatively, a molded part made of thermoplastic material can also be inserted into the shell or the housing part in such a manner that a compression of the metal oxide ceramic occurs.

In addition, the hollow body can be made largely of a material that has a thermal conductivity of less than 50 W/mK, and preferably less than 25 W/mK.

By means of a low thermal conductivity of the hollow body, heat transport out of the hollow body, and hence out of the thermosensitive medium, can be reduced. The thermal conductivity of simple steels is normally in a range from 40 W/mK to 50 W/mK. The thermal conductivity of stainless steels, which are to be especially preferred, is normally in a range from 15 W/mK to 25 W/mK. This is especially advantageous because it means that smaller quantities of heat are sufficient to produce a desired volume change in the thermosensitive medium. The loss of heat due to unwanted radiation from the hollow body is minimized by as low a thermal conductivity as possible of the hollow body.

Also, it is useful if the heating element is attached to an exterior surface of the hollow body by means of an electrically insulating and thermally conductive adhesive.

An electrically insulating and simultaneously thermally conductive adhesive is especially advantageous because both the electrical insulation and the thermal conductivity are produced by just one additional component. At the same time, it is ensured thereby that the thermal connection of the heating element to the hollow body is especially advantageous and that the losses that occur are kept as low as possible.

Moreover, the heating element can be composed of a PTC heating element.

A PTC heating element (Positive Temperature Coefficient heating element) is especially advantageous, since it can be manufactured in a simple way and can be made in nearly any desired form. Series connection and parallel connection of individual PTC heating elements are both equally possible, by which means different heat outputs can be generated in a simple way. In addition, the effect that the PTC heating elements control their own heat output as a function of the temperature achieved is especially advantageous.

If the PTC heating elements are disk-shaped, it is especially preferred for the ratio between the diameter and the thickness of the disk to be between 2 and 25.

The heating element can be composed of a heating wire, and/or a heating sheet, arranged on or at a molded article.

A heating element with a heating wire arranged on or in a molded article is especially advantageous because the design of the heating element is especially simple, and a nearly unlimited range of variations can be created. The same advantages apply analogously for a heating sheet. The region of the shell that projects into the cavity can be filled especially well by means of the two heating elements.

Electrical insulation can be accomplished through, e.g., lamination or through coating with an electrically nonconductive material such as Kapton, for example. Materials that are designed to be adequately resistant to the corrosive effects of the coolant and also withstand temperatures of above 220° Celsius are especially advantageous for this purpose. Examples of advantageous materials are thermoplastics such as polytetrafluoroethylene (PTFE) or polyetheretherketone (PEEK).

The molded article can advantageously be made of an electrically nonconductive material, for example a metal oxide ceramic.

Moreover, it can be advantageous for the heating element to be connected to a molded article that has feed-throughs for the electrical contacts of the heating element.

The heating element can be connected to a molded article in such a manner that the heating element can be positioned advantageously on the hollow body. To this end, the molded article preferably has openings through which the electrical contacts can be routed.

An exemplary embodiment provides that the hollow body has an opening that is located essentially opposite the heating element, wherein a piston element that is movably supported in the opening is conducted through the opening, wherein a force component resulting from a volume change in the thermosensitive medium can be transmitted to the piston element.

A piston element that is either conducted through an opening directly into the thermosensitive material or is separated from the thermosensitive material by an elastomer insert is advantageous in order to redirect the force component arising from the volume expansion of the thermosensitive material onto the piston element. Then the piston element can in turn advantageously transmit the force component to downstream elements. These elements include, in particular, valve disks and actuating components of the thermostat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
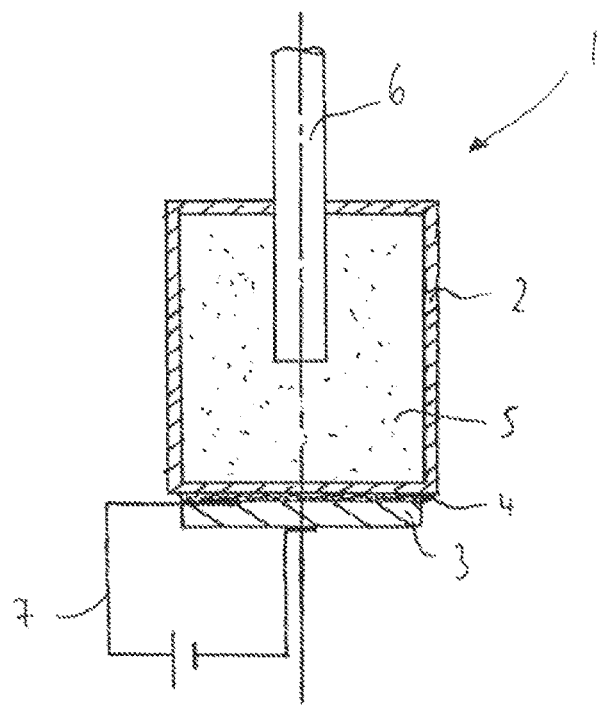
FIG. 1 is a schematic sectional view through a hollow body according to an embodiment of the invention with a heating element that is connected by means of an adhesive, wherein the adhesive is electrically insulating and thermally conductive.

FIG. 1 shows a schematic sectional view of an expansion element 1. The expansion element 1 has a hollow body 2 that is filled with a thermosensitive material 5. The hollow body 2 can advantageously have a cylindrical basic shape. Other designs, such as cuboid or spherical hollow bodies, may also be provided in alternative embodiments.

On its top surface, the hollow body 2 has an opening through which a piston element 6 passes. As a result of a volume change in the thermosensitive medium 5, the piston element 6 can be moved up and down in the interior of the hollow body 2.

Provided beneath the hollow body 2 is a plate-like heating element 3, which is attached to an exterior surface of the hollow body 2 by an adhesive 4. The adhesive 4 in this design is electrically insulating and thermally conductive. In this way, the heat from the heating element 3 can advantageously be transmitted to the hollow body 2 and in particular to the thermosensitive medium 5. At the same time, a short circuit is precluded by the electrical insulation.

In advantageous fashion, the heating element 3 is a PTC heating element. It is connected to a voltage source by a circuit 7.

In alternative embodiments, the heating element 3 can also be implemented with a cup shape, for example, and can include a bottom region of the hollow body 2.

Figure 2:
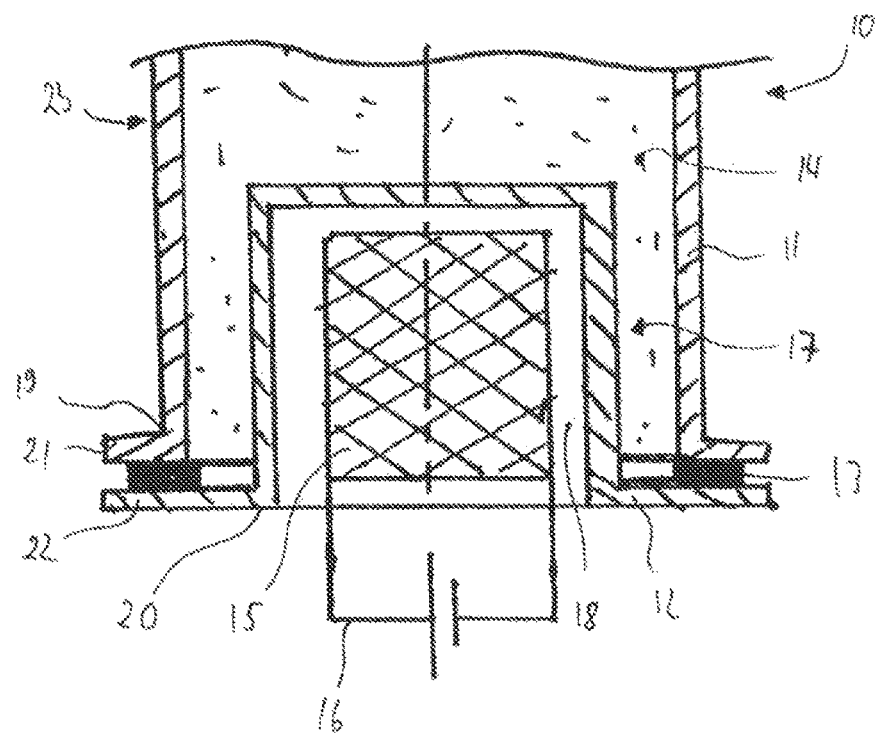
FIG. 2 is a schematic sectional view through a multi-part hollow body, wherein a heating element is inserted into the cup-shaped shell, and electrical insulation is provided between the cup-shaped housing part and the cup-shaped shell.

FIG. 2 shows another schematic sectional view of an alternative expansion element 10. The expansion element 10 has a cup-shaped housing part 11 and a cup-shaped shell 12.

The cup-shaped shell 12 is inserted into the cavity formed by the cup-shaped housing part 11 through an open region 19 of the cup-shaped housing part 11. Both the cup-shaped housing part 11 and the cup-shaped shell 12 have a circumferential flange 21 or 22 at their open end regions 19 or 20. The cup-shaped housing part 11 is connected to the cup-shaped shell 12 by means of the two flanges 21 and 22.

Electrical insulation 13 is placed between [the two parts at] the joint. In this way, the cup-shaped shell 12 is electrically insulated from the cup-shaped housing part 11.

Located in the interior of the cup-shaped housing part 11 is a thermosensitive medium 14. Together, the cup-shaped housing part 11 and the cup-shaped shell 12 form the hollow body 23.

Formed between the exterior surface of the cup-shaped shell 12 and the interior surface of the cup-shaped housing part 11 is a circumferential annular gap 17 that is likewise filled with the thermosensitive material 14.

Depending on the design of the cup-shaped shell 12 and the cup-shaped housing part 11, the annular gap 17 can have a cylindrical or other shape resulting from the spacing between the interior surface of the cup-shaped housing part 11 and the exterior surface of the cup-shaped shell 12.

A heating element 15 is inserted in the cup-shaped shell 12. This heating element is connected to a voltage source by an electric circuit 16. An air gap 18 is shown between the heating element 15 and the cup-shaped shell 12. This gap can vary depending on the design of the heating element 5 relative to the cup-shaped shell 12. Due to the electrical insulation 13, the heating element 15 can also rest directly on the cup-shaped shell 12 with full-area contact.

As a result of inserting the heating element 15 into the cup-shaped shell 12, the overall heat exchange area between the heating element 15 and the cup-shaped shell 12, and hence also with the thermosensitive medium 14, increases.

The cup-shaped shell 12 and the cup-shaped housing part 11 can be implemented as a deep-drawn part, a turned part, or a cast part, for example. FIG. 2 does not restrict the possibilities for implementing these two elements.

As shown in FIG. 2, the heating element 15 can likewise be constructed with a cylindrical shape, but it can also be matched to the inside diameter of the cup-shaped shell as a function of the shape of the cup-shaped shell.

In alternative embodiments, it would also be possible, for example, to stagger multiple heating elements, such as those already shown in FIG. 1, inside the cup-shaped shell.

Placement of the heating element 15 in the interior of the cup-shaped shell 12 is especially advantageous, since the heat transmission can thus take place in a direct way through the cup-shaped shell 12 to the thermosensitive medium 14. The proportion of heat that would transfer to a coolant that could possibly be flowing around the expansion element 10 is considerably reduced as a result.

In an especially advantageous embodiment, the cup-shaped shell 12, in particular, has greater thermal conductivity as compared to the cup-shaped housing part 11. This ensures that the heat transfer from the heating element 15 to the thermosensitive medium 14 is improved.

The cup-shaped housing part 11, in turn, has as low a coefficient of thermal conductivity as possible in order to prevent heat from the thermosensitive medium 14 or from the heating element 15 being delivered directly to a coolant that flows around the expansion element 10 during operation.

Figure 3:
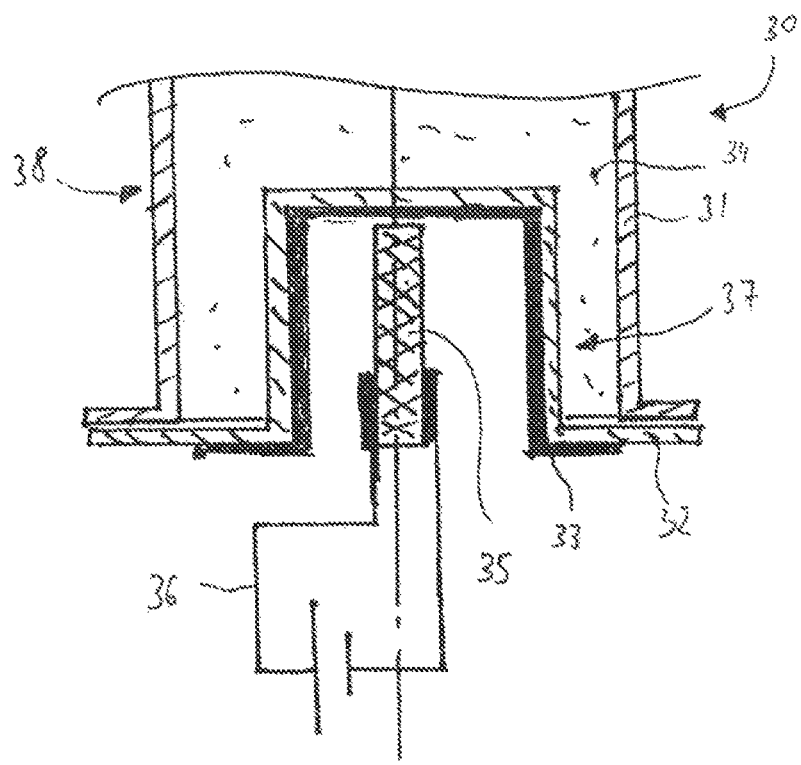
FIG. 3 is a schematic sectional view through a multi-part hollow body from FIG. 2, wherein electrical insulation is only provided between the heating element and the exterior wall of the cup-shaped shell.

FIG. 3 shows another schematic, sectional view of an expansion element 30. As already shown in FIG. 2, the hollow body 38 is composed of a cup-shaped housing part 31 and a cup-shaped shell 32 inserted therein. Likewise formed between these two elements is an annular gap 37, which is oriented to the shape of the cup-shaped shell 32 relative to the cup-shaped housing part 31.

Located in the interior of the hollow body 38 is a thermosensitive medium 34.

In contrast to FIG. 2, the flanges of the cup-shaped shell 32 and of the cup-shaped housing part 31 are now connected directly to one another, and are not separated from one another by electrical insulation.

Figure 4:
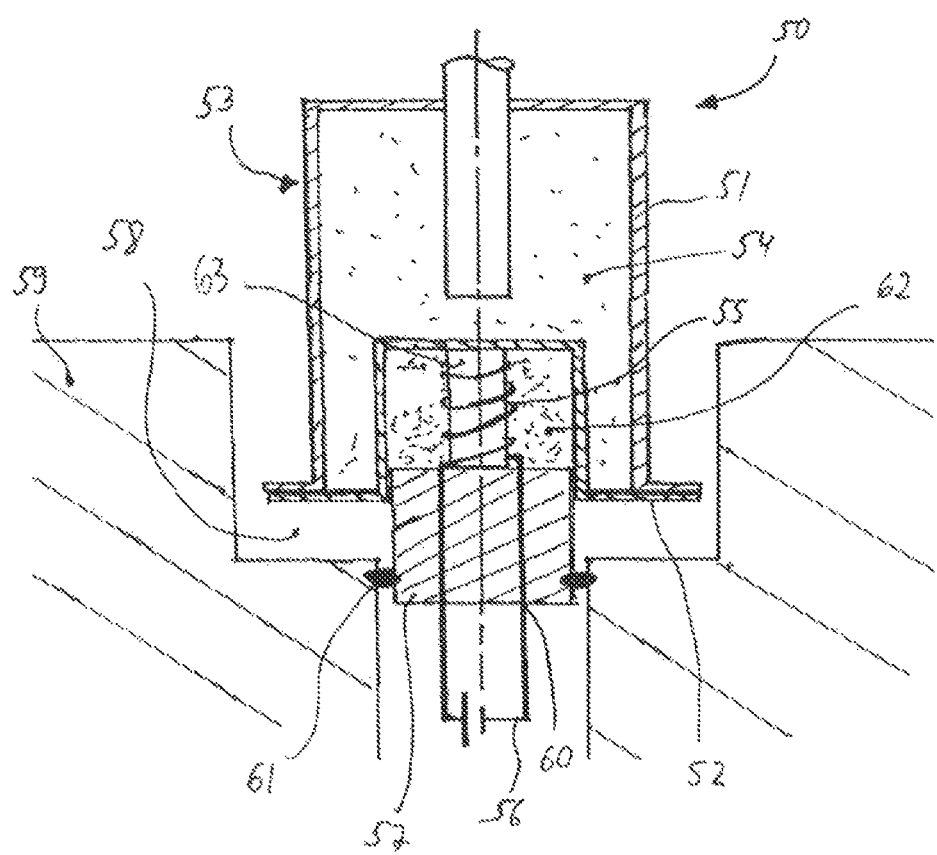
FIG. 4 is a schematic sectional view of a hollow body with a heating element having an ohmic resistance, wherein the hollow body and the heating element are supported by a molded part on a housing.

The connection between the cup-shaped housing part 31 and the cup-shaped shell 32 in FIG. 2 through 4 can be accomplished by gluing, welding, flanging, screwing, or locking, for example.

The interior surface of the cup-shaped shell 32 is provided with electrical insulation 33. Here, the term 'interior surface of the cup-shaped shell 32' describes the surface facing away from the cavity of the hollow body 38. This can be accomplished by means of a film made of Kapton material, for example. The electrical insulation 33 ensures that no electrical short circuit occurs between the heating element 35 inserted in the cup-shaped shell 32 and the cup-shaped shell 32. In addition, Kapton material has the property of not impeding heat transport.

The heating element 35 is connected to a voltage source by a circuit 36. The heating element 35 can likewise be composed of one PTC heating element or of a plurality of PTC heating elements connected to one another.

FIG. 4 shows an alternative embodiment of an expansion element 50. As in the preceding FIGS. 2 and 3, this element is composed of a cup-shaped housing part 51 and a cup-shaped shell 52. The expansion element 50 or the hollow body 53 is filled with a thermosensitive medium 54. A piston element passes through the top surface of the expansion element 50.

In contrast to the preceding figures, the heating element 55 now is not composed of a PTC heating element, but rather a heating wire that is wound around a molded article 63. The heating element 55 thus produces heat as a result of the ohmic resistance of the heating wire. The gap between the heating element 55 and the cup-shaped shell 52 is filled with an electrically nonconductive and thermally conductive material 62. The open region of the cup-shaped shell 52 is closed toward the bottom by a molded part 57. Consequently, the electrically nonconductive and thermally conductive material 62 is held in the region around the heating element 55 enclosed by the cup-shaped shell 52.

In alternative embodiments, a heating sheet or another arrangement of an element that generates heat through an ohmic resistance can also be provided in place of the wound heating wire.

Alternatively, a single PTC heating element or a plurality of PTC heating elements can also be provided.

The molded part 57 has recesses 60 through which pass the electrical contacts of the circuit 56, by which means the heating element 55 is connected to a voltage source. The entirety of the expansion element 50 with the inserted molded part 57 is placed in a housing 59. In this design, it is supported relative to the walls of the housing 59 by a sealing element 61. Provided between the expansion element 50 and the housing 59 is an air gap 58 that constitutes thermal and electrical insulation of the expansion element 50 relative to the environment.

FIG. 2 through 4 have in common that the heating element 15, 35, 55 is inserted into the interior of the cup-shaped shell 12, 32, 52 in each case. As a result, the heat transmission area between the heating element 15, 35, 55 and the cup-shaped shell 12, 32, 52 is enlarged as a whole in each case, and the heat transfer to the applicable thermosensitive medium 14, 34, 54 in the interior of the hollow body 23, 38, 53 is improved. At the same time, unwanted heat loss to a coolant flowing around the applicable expansion elements 10, 30, 50 is minimized.

All the exemplary embodiments shown in FIG. 1 through 4 are by way of example, and serve to describe the inventive concept. They can be combined with one another and do not have any limiting character.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A thermostat comprising:
   a hollow body, the hollow body being at least partly filled with a thermosensitive medium;
   a heating element for heating the thermosensitive medium, the heating element being arranged outside of the hollow body and is at least partially insulated electrically from the hollow body,
   wherein the heating element is connected to the hollow body in a thermally conductive manner,
   wherein the hollow body is implemented as multiple parts,
   wherein a first housing part of the hollow body is configured as a cup-shaped shell that projects into a hollow space of the hollow body,
   wherein a second housing part is configured as a cup-shaped housing part,
   wherein the cup-shaped shell and the cup-shaped housing part each have a radially surrounding flange at an open end region thereof, and
   wherein the cup-shaped shell is positioned in the open end region of the cup-shaped housing part and the flange of the cup-shaped shell is connected to the flange of the cup-shaped housing part.

2. The thermostat according to claim 1, wherein the ratio between an inside diameter of the cup-shaped housing part and an outside diameter of the cup-shaped shell lies in a range from greater than 1 to less than 2.5.

3. The thermostat according to claim 1, wherein the cup-shaped shell is connected to the cup-shaped housing part in a liquid-tight manner, and wherein electrical insulation is arranged between the cup-shaped shell and the cup-shaped housing part.

4. The thermostat according to claim 1, wherein the heating element is a PTC heating element.

5. The thermostat according to claim 1, wherein the heating element is a heating wire and/or a heating sheet arranged on or at a molded article.

6. The thermostat according to claim 1, wherein the heating element is connected to a molded part that has recesses for the electrical contacts of the heating element.

7. The thermostat according to claim 1, wherein the hollow body has an opening that is located essentially opposite the heating element, wherein a piston element that is movably supported in the opening is conducted through the opening, and wherein a force component resulting from a volume change in the thermosensitive medium is transmitted to the piston element.

8. The thermostat according to claim 1, wherein the cup-shaped shell is connected to the cup-shaped housing part in a liquid-tight manner, and wherein electrical insulation is arranged between the flange of the cup-shaped shell and the flange of the cup-shaped housing part.

9. The thermostat according to claim 1, wherein the flange of the cup-shaped shell directly contacts the flange of the cup-shaped housing part.

10. The thermostat according to claim 1, wherein the open end region of each of the cup-shaped housing part and the cup-shaped shell are provided on a same side of the hollow body.

11. A thermostat comprising:
a hollow body, the hollow body being at least partly filled with a thermosensitive medium;
a heating element for heating the thermosensitive medium, the heating element being arranged outside of the hollow body and is at least partially insulated electrically from the hollow body,
wherein the heating element is connected to the hollow body in a thermally conductive manner,
wherein the hollow body is implemented as multiple parts, and wherein a first housing part of the hollow body is configured as a cup-shaped shell that projects into a hollow space of the hollow body,
wherein the heating element is arranged in a region of the cup-shaped shell that projects into the hollow space, and wherein an electrically insulating layer and/or a thermally conductive layer is arranged between the heating element and the cup-shaped shell.

12. The thermostat according to claim 1, wherein the hollow body is made of a material that has a thermal conductivity of less than 50 W/mK or less than 25 W/mK.

13. A thermostat comprising:
a hollow body, the hollow body being at least partly filled with a thermosensitive medium;
a heating element for heating the thermosensitive medium, the heating element being arranged outside of the hollow body and is at least partially insulated electrically from the hollow body,
wherein the heating element is connected to the hollow body in a thermally conductive manner, and
wherein the heating element is attached to an exterior surface of the hollow body via an electrically insulating and thermally conductive adhesive.

* * * * *